United States Patent
Guzman Manzo et al.

(10) Patent No.: US 11,377,365 B2
(45) Date of Patent: Jul. 5, 2022

(54) PROCESS FOR THE SELECTIVE REMOVAL OF COPPER COMPOUNDS AND OTHER IMPURITIES WITH RESPECT TO MOLYBDENUM AND RHENIUM, FROM MOLYBDENITE CONCENTRATES

(71) Applicant: Molibdenos y Metales S.A., Santiago (CL)

(72) Inventors: Manuel Enrique Guzman Manzo, Santiago (CL); John Patrick Graell Moore, Santiago (CL)

(73) Assignee: MOLIBDENOS Y METALES S.A., Santiago (CL)

( * ) Notice: Subject to any disclaimer, the term of this patent is extended or adjusted under 35 U.S.C. 154(b) by 328 days.

(21) Appl. No.: 16/458,419

(22) Filed: Jul. 1, 2019

(65) Prior Publication Data

US 2020/0131047 A1    Apr. 30, 2020

(30) Foreign Application Priority Data

Oct. 30, 2018  (CL) ................................. 2018-3101

(51) Int. Cl.
  *C01G 39/02*   (2006.01)
  *C22B 15/00*   (2006.01)
  *C22B 34/34*   (2006.01)
(52) U.S. Cl.
  CPC .......... *C01G 39/02* (2013.01); *C22B 15/0071* (2013.01); *C22B 34/34* (2013.01)

(58) Field of Classification Search
  CPC ...... C01G 39/02; C22B 15/0071; C22B 34/34
  See application file for complete search history.

(56) References Cited

U.S. PATENT DOCUMENTS

| | | | | |
|---|---|---|---|---|
| 2,238,250 A | * | 4/1941 | Curtis ................... | C01G 39/06 423/55 |
| 3,834,893 A | * | 9/1974 | Queneau et al. ....... | C22B 34/34 423/53 |
| 4,379,127 A | * | 4/1983 | Bauer .................... | C22B 34/34 423/166 |
| 2013/0251601 A1 | * | 9/2013 | Baburao ............ | B01D 53/1475 422/198 |
| 2013/0251609 A1 | * | 9/2013 | Rockandel ............. | C01G 39/02 423/606 |
| 2015/0147247 A1 | * | 5/2015 | Choi ....................... | C22B 34/34 423/53 |
| 2018/0016684 A1 | * | 1/2018 | Simpson Alvarez ..... | C25B 1/30 |

FOREIGN PATENT DOCUMENTS

| | | | |
|---|---|---|---|
| CA | 959654 A1 | * | 12/1974 |
| CN | 104745812 A | * | 7/2015 |
| CN | 106477630 A | * | 3/2017 |

* cited by examiner

*Primary Examiner* — Melissa S Swain
(74) *Attorney, Agent, or Firm* — Fox Rothschild LLP

(57) ABSTRACT

Disclosed is a process for the selective removal of copper compounds, and other impurities with respect to molybdenum and rhenium, from concentrates of molybdenite ($MoS_2$) with a copper content that is higher than 0.5% in dry weight.

16 Claims, 1 Drawing Sheet

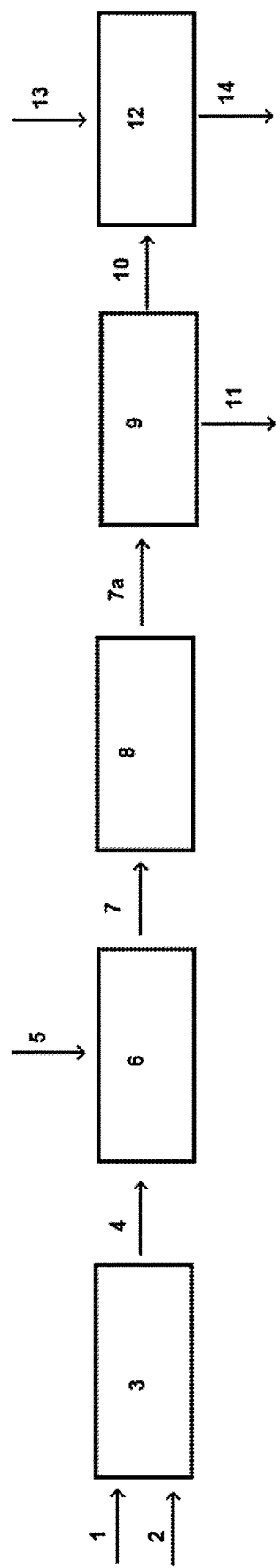

PROCESS FOR THE SELECTIVE REMOVAL OF COPPER COMPOUNDS AND OTHER IMPURITIES WITH RESPECT TO MOLYBDENUM AND RHENIUM, FROM MOLYBDENITE CONCENTRATES

CROSS REFERENCE TO RELATED APPLICATION

This application claims priority to Chilean Patent Application No. 2018-3101, filed Oct. 30, 2018, the entire contents of which is incorporated by reference in its entirety

FIELD OF INVENTION

This invention is about metallurgical processes, referring to the cleaning of molybdenite concentrates ($MoS_2$), using hydrometallurgical techniques.

BACKGROUND

The molybdenite concentrates are from a primary or secondary source.

The primary concentrates are obtained through the mining of molybdenum and later flotation concentration to meet market specifications, particularly a molybdenite concentrate with a concentration of copper of less than 0.5% in weight, for the production of technical grade molybdenum trioxide to be used in steel manufacturing processes (the main use of molybdenum).

The secondary concentrates are obtained as a by-product of the concentration processes for copper ores from copper deposits. In copper concentration plants, the molybdenum is first separated off as a mixed concentrate of copper and molybdenum, then each separate concentrate is obtained by flotation. The concentration of residual copper in the molybdenite concentrate is variable, depending on the number of cleaning stages in the molybdenite flotation circuits and on whether or not there is a leaching process for dissolving copper. Current practice is not to leach copper in situ, promote the greatest recovery of copper from the molybdenite concentrate and leave the problem of high copper content in said molybdenite concentrate to be solved by the conversion plants to molybdenum trioxide, this is how the process proposed in this invention deals with this problem.

A solid material, with a concentration of molybdenum that is approximately 50% in weight and copper that is lower than 0.5% in weight, and meeting the specifications for a commercial concentrate, is obtained in the molybdenite flotation circuits. A molybdenum concentrate that does not meet these specifications is defined as a dirty concentrate and can be produced in the molybdenum plants by reducing the number of flotation stages in order to increase recovery (and thus diminishing the molybdenum grade in the concentrate). This type of dirty concentrate has to be cleaned to be properly marketed and avoid paying fines for the impurities it contains. Cleaning the concentrates enables an efficient roasting of the cleaned concentrate without the formation of low-melting-point molybdates (for example, copper molybdate, sodium molybdate and other molybdates) that can lead to the formation of agglomerates that adhere to the floor, paddles and walls of the furnace, decreasing its availability since the furnace has to be cleaned with greater frequency, moreover, the agglomerates in the furnace also decrease the reaction kinetics of the roasting thus lowering the general productivity of the process. Accordingly, the aim of the process being proposed is to clean the concentrate by leaching copper, mainly, and other impurities, without dissolving molybdenum and rhenium, particularly rhenium, by keeping proper control of the process variables.

Conventional purification methods for molybdenite concentrates are based on leaching with chloride, for example, the process described in U.S. Pat. No. 4,500,496 known as the "Brenda process" or patents that introduce improvements or modifications to this process, such as U.S. Pat. No. 7,169,371, patent application WO 2015/199,098, or the U.S. Pat. No. 7,794,677. In these processes, the leaching of copper compounds from the molybdenite concentrate is done using $CuCl_2$, $FeCl_3$ and $CaCl_2$, either separately or in combination, as leaching agents. These processes are characterized by high operating costs and also involve high investment costs.

Alternative studies have been done into the purification of molybdenite, aimed at not using chlorinated compounds as leaching agents. As is the case of the study carried out by J. B Yianatos and V. Antonucci (Minerals Engineering, Vol. 14, N° 11, pages: 1411-1419, 2001) where the molybdenite concentrate is leached with a concentrated sulfuric acid in a batch process, heating the pulp by micro-wave radiation at temperatures in the 190-240° C. range, at ambient pressure. In this paper, the disadvantages relate to the occurrence of secondary chemical reactions between the sulfuric acid and the elementary sulfur, promoting the formation of gaseous $SO_2$ that greatly increases the consumption of sulfuric acid in the system. An additional problem is the formation of process solutions with high concentrations of sulfuric acid and copper that are hard to treat in situ for the recovery of the copper content and because of the high cost of disposing of the acid.

Another way of extracting the impurities from the molybdenum concentrate is by the pressurized leaching process proposed in patent application US 2008/0216606, where it is not leached with a solution rich in chloride, but it does require the solid material to be thoroughly milled before leaching, with the consequent associated energy cost if the intention is to escalate this to an industrial plant.

The hydrometallurgic processes for purifying molybdenite concentrates are classified as follows: a) leaching with pressurized oxygen; b) leaching with hot concentrated sulfuric acid; and c) leaching with chlorides (ferrous chloride or others).

The processes relating to the oxidation of molybdenite concentrates by using pressurized oxygen in autoclaves can be divided, for these purposes, into two categories:

1.—Total oxidation of the molybdenite ($MoS_2$) in the autoclave in order to produce molybdenum trioxide.

The total oxidation process can be described by the following reactions:

$$2MoS_2 + 9O_2(g) + 6H_2O = 2MoO_3 \cdot H_2O + 4H_2SO_4$$

$$MoO_3 \cdot H_2O = MoO_3 + H_2O$$

This is a high temperature (>200° C.) and high pressure (>30 atmospheres) process, where the final product is molybdenum trioxide (solid) and sulfuric acid in solution.

The impurities in the molybdenite concentrate (particularly sulfides and metal oxides) dissolve in different percentages and are reported in the solution. Particularly the copper sulfides and zinc dissolve entirely. The gangue from the concentrate does not dissolve and accompanies the solid product (the molybdenum trioxide).

As described, this is a process for converting molybdenite into molybdenum trioxide and not a leaching process for producing a clean molybdenite concentrate.

2.—Cleaning the molybdenite concentrate for the purpose of producing molybdenite concentrate with low concentrations of impurities.

This is a selective leaching (or dissolution) process of the impurities in the molybdenite concentrate, particularly the sulfides and metal oxides (such as copper sulfides, iron sulfide, zinc sulfide, oxides of: sodium, magnesium, calcium, antimony, cobalt, chromium, manganese and nickel, among others).

The main impurity it seeks to remove is copper (normally present in the form of copper sulfides: chalcopyrite, chalcocite, covellite and others), so this cleaning process is also called decoppering process.

The sulfides leaching process can be exemplified through the oxidation of the chalcopyrite in the concentrates, as per the following reactions that happen simultaneously:

$$CuFeS_2 + H_2SO_4 + 5/4 O_2(g) + \frac{1}{2} H_2O = CuSO_4 + Fe(OH)_3 + 2S°$$

$$CuFeS_2 + 5/2 H_2O + 17/4 O_2(g) = CuSO_4 + 2H_2SO_4 + Fe(OH)_3$$

$$S° + 6Fe(OH)_3 + 5H_2SO_4 = 6FeSO_4 + 14H_2O$$

A low percentage (<10%) of molybdenite ($MoS_2$) is dissolved in this process. In particular the rhenium is not dissolved in this process. The product that is obtained is molybdenite concentrate with a very low content of impurities (clean concentrate). The dissolved molybdenum (and eventually the dissolved rhenium) is recovered by treating the solutions by solvent extraction.

The subject of the invention is the cleaning of molybdenite concentrate (group 2) and not the total oxidation process (group 1).

In accordance with the above, here are the following documents for the state of the art:

Patent CL-33.642, refers to a method for recovering molybdenum oxide by oxidizing a molybdenum sulphide concentrate, contaminated with impurities, in which the concentrate, with an average particle size within a 20 to 90 micron range, is suspended to make an aqueous suspension that is oxidized at a high temperature and a high partial oxygen pressure in an autoclave. The suspension removed from the autoclave is submitted to a filtration to separate the molybdenum oxide from the primary filtered that contains sulfuric acid and this filtered is neutralized with lime to form calcium sulfate that is then separated from the suspension to supply a second filtered. This document focuses on the total oxidation of the $MoS_2$, whereby, despite the use of pressure oxidation and the use of sulfuric acid as a leaching agent, its aim is to get a molybdenum oxide product and not a purer molybdenum concentrate.

Patent application CL-955-2002 refers to a procedure for optimizing the oxidation of molybdenum concentrates, comprising: a) forming an aqueous pulp of said molybdenum concentrates; b) heating said pulp to a temperature of at least 200° C.; c) agitate said pulp while it is in contact with an oxygen-free atmosphere; d) oxidizing said pulp in said atmosphere under an oxygen overpressure of at least about 2.585,034 mm Hg; e) regulating the amount of ferric iron concentration and the excess of sulfuric acid concentration during the oxidation reaction; and hence, f) producing a leaching pulp where more than 90% of the molybdenum in said molybdenum concentrate has been oxidized. This document is also relevant to the total oxidation of the molybdenite.

This document also reports the pressure leaching of a concentrate, specifically of a molybdenite concentrate, where sulfuric acid is present in the leaching. This patent application must also be classified in group 1 (total oxidation) of oxidations of $MoS_2$ concentrates. Where moreover, greater emphasis is put on regulating the quantities of ferric iron and sulfuric acid to have better control of the operation.

Patent CL-53.894 discloses a system and method for producing molybdenum oxide(s) from molybdenum sulphide. The system includes a pressure leach vessel, a solid/liquid separation stage coupled to the pressure leach vessel, a solvent extraction stage coupled to the solid/liquid separation stage, and a base extraction coupled to the solvent extraction stage. The method includes supplying a molybdenum sulphide feed, submitting the feed to a pressurized leaching process, submitting the pressurized leaching discharge to a solid/liquid separation process to produce a discharge liquid flow and a discharge solid flow and submitting the discharge liquid flow to a solvent extraction process and a base extraction process. This document must also be classified in group 1 (total oxidation) of oxidations of $MoS_2$ concentrates.

Patent CL-33.707 refers to a purification process of molybdenite concentrates through hot digestion with a concentrated sulfuric acid at temperatures over 100° C., which comprises the acid digestion and leaching stages with water at temperatures under 90° C. The concentrates correspond to molybdenite concentrates contaminated with chalcopyrite, phosphorus compounds and arsenic compounds.

The acid digestion stage is the decisive stage of the process, which consists of mixing the impure molybdenite concentrate and industrial sulfuric acid in well-defined ratios in weight and at a suitable temperature and time.

During this stage, a selective sulfation of the copper and other impurities contained in the molybdenite concentrate is produced.

The species that were sulfated in the above stage are now removed by leaching with natural water. The washed solid constitutes the purified molybdenite concentrate.

This patent does not refer to leaching with sulfuric acid with pressurized oxygen, but rather refers to normal pressure leaching, where hot concentrated sulfuric acid is added to dissolve of elements other than molybdenum and rhenium. The action of the sulfuric acid can be seen in the treatment of molybdenite concentrates that contain different impurities (such as copper, iron, phosphorus and arsenic).

Patent application CN104745812 (A) describes a molybdenum-sulfur separation method that comprises the following steps: after the molybdenite concentrate (raw material) has been milled in a ball mill, put it in a high-pressure autoclave, add a sulfuric acid solution according with the solid/liquid volume ratio of 4-10 times, and introducing oxygen for reacting at 160-240° C. under pressure of 1.6-3.0 MPa for 8-16 hours, which implements the molybdenum-sulfur separation. This method uses a molybdenite concentrate that contains 45-55% molybdenum and 30-40% sulfur as the raw material and adopts a dilute sulfuric acid solution to perform low oxygen pressure leaching on the molybdenite concentrate, thus achieving the goal of separating molybdenum from the sulfur and providing beneficial conditions for the next stage of molybdenum-sulfur recovery.

This refers to a process of total molybdenite oxidation in the concentrate (group 1). The overall reaction of the process is mentioned:

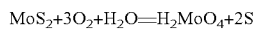
$$MoS_2 + 3O_2 + H_2O = H_2MoO_4 + 2S$$

The $H_2MoO_4$ compound is molybdic acid, whose equivalent formula is $MoO_3 \ast H_2O$.

This process of this reference uses long residence times (8 to 16 hours), high partial pressures of oxygen (1.0 to 1.8 MPa) and high temperatures (160° C. to 240° C.), which conditions indicate that the final product of the process will be molybdenum trioxide, in other words, it corresponds to a total oxidation (group 1).

The present invention is a feasible technical and economic solution to the problem of the removal of impurities from the molybdenite concentrate. Preferably the impurities that are eliminated from the concentrate are copper sulfides which, after having been eliminated from the concentrate, are recovered to take advantage of their economic potential.

Furthermore, this process does not require highly corrosive solutions for the removal of impurities from the molybdenum concentrate. On the contrary, the reaction of the oxygen or of the gas containing it permits forming sulfuric acid in situ by the oxidation of the copper sulfides and other metals.

In contrast, in the processes cited in the literature for cleaning dirty concentrates, the solutions used contain highly corrosive reagents, such as concentrated $FeCl_3$, $CuCl_2$, HCl, $Cl_2$ and $H_2SO_4$, that mean that special or exotic materials have to be used for the equipment in contact with said solutions and, moreover, that special care is required in their handling to avoid harming people and the environment.

The product of the present cleaning process is a commercial molybdenum concentrate, suitable for later producing technical grade molybdenum trioxide by roasting that meets the requirements for use in the steel industry, in the manufacture of other molybdenum products, such as ferromolybdenum, or as a precursor for the manufacture of pure molybdates of molybdenum, such as ammonium dimolybdate (ADM), ammonium heptamolybdate (AHM) and other molybdates, that, in turn, permit the manufacture of chemical grade molybdenum trioxide.

The cleaning process described below is selective for the extraction of copper sulfides and other elements, excluding molybdenum and rhenium, particularly rhenium, staying within the proper ranges for the main process variables, namely oxygen overpressure and process temperature.

The process being described is also flexible, permitting the recovery of molybdenum from the leach liquors in practical cases in which the process conditions deviate from selectivity in referred to copper sulfides and there is consequently a partial dissolution of molybdenum and rhenium. In these cases, the solutions produced in the leaching of the dirty concentrate have characteristics that enable the extraction of molybdenum and rhenium using solvent extraction circuits according to known methods in the state of the art, mainly by use of tertiary amines as extractants; re-extraction with an ammonium hydroxide solution; molybdenum recovery by precipitation of ammonium molybdate and recovery of rhenium by crystallizing ammonium perrhenate.

The copper (that is dissolved in the leaching solution) can be recovered by cementation or electrodeposition from the leach liquors or from the raffinate of the solvent extraction process, in cases where, as a preliminary, the next step is the separation of molybdenum and rhenium.

BRIEF DESCRIPTION OF THE DRAWING

FIG. 1 shows a flowchart of the process of invention.

SUMMARY OF THE DISCLOSURE

This invention is a purification or cleaning process for a molybdenite concentrate. In this process, the concept of purification or cleaning mainly refers to the extraction, removal or leaching of copper sulfide compounds, however, it also extracts other impurities, particularly iron, zinc, nickel, sodium, calcium and manganese, from the molybdenite concentrate. The process comprises a stage where the molybdenite concentrate is mixed or repulped with water that has been acidified with sulfuric acid (in the range of 0 to 20 g/l) to form a pulp, which is fed into an autoclave where a pressurized leaching stage is developed by injecting oxygen or an oxygen-bearing gas for the entire residence time, thus producing a pulp composed of a clean or purified molybdenum concentrate and a liquor that is rich in impurities dissolved in a sulfuric acid medium. The process is developed under auto-thermal conditions, mainly using the heat from the reaction of the oxidation of the copper sulfides and iron. This pulp is carried to a solid/liquid separation stage, where a clean molybdenum concentrate is obtained together with a liquor containing the copper compounds and other elements extracted from the original concentrate, which are recovered through later industrial processes, such as solvent extraction, ion exchange, electrodeposition or others.

The process is efficient for (primary and secondary) copper sulfides, iron, zinc, nickel, sodium, calcium, manganese and other metals. And as long as a control is kept over the main variables of the process, such as oxygen overpressure and temperature, the molybdenum sulfides and rhenium, particularly rhenium, will not dissolve.

The cleaning process in the autoclave is, consequently, a purification process that enables an optimum quality of concentrate for feeding the roasting furnaces to be obtained, achieving increases in production capacity and the recovery of rhenium.

DETAILED DESCRIPTION

The process of the invention is a process for the efficient removal of copper compounds, and other elements (except molybdenum and rhenium), from dirty molybdenite concentrates. The copper compounds and other elements present in this concentrate are of the sulfide type that came about thanks to the inefficiencies of the flotation process from which the molybdenite concentrate is obtained.

The copper sulfide compounds that are present in the molybdenite concentrate preferably are primary sulfides, such as chalcopyrite ($CuFeS_2$), and secondary sulfides, such as covellite (CuS) and chalcocite ($Cu_2S$). In addition to these sulfide compounds, this invention is also capable of leaching Cu, Fe, As, P, Na, Co, F, Cl, Ca, Mn, Zn and Ni compounds.

The process of the present invention comprises the selective removal of the copper compounds and other impurities with respect to the molybdenum and rhenium from the molybdenite concentrate with a higher copper content than 0.5% in dry weight, according to the following stages:
mixing a concentrate of impure $MoS_2$ (1) with process water and/or a leaching solution that is diluted with sulfuric acid (2), with a concentration of sulfuric acid is in the range of 0 to 20 g/l, in a repulping stage (3), to obtain a first pulp (4) with a solid content in the pulp of 50 to 20% in weight, maintaining equivalently a ratio of liquid to solid in the range of 1/1 to 4/1, volume/weight;
leaching the first pulp (4) inside a pressure reactor, in a pressurized leaching stage (6) at an oxidizing atmosphere, with an oxygen-bearing gas (5), at a leaching temperature between 110° C.-180° C. with a partial pressure for the oxidizing gas inside the reactor between 20-150 psig (0.1-1.0 MPa) to obtain a second pulp (7) containing the clean molybdenite concentrate and a solution or mother liquor containing the dissolved impurities, including the sulfuric acid that was generated in situ by the selective oxidation of the sulfur contained in the sulfides that initially formed the impurities (particularly copper sulfide and zinc sulfide) in the dirty molybdenite concentrate;
carrying the second pulp (7) to a cooling tank (8), to get a third pulp (7a) with a temperature of at most 60° C.;
carrying the third pulp (7a) to a solid/liquid separation stage (9) to obtain a clean molybdenite concentrate (10) with a percentage of copper of less than 0.5% in weight and a liquor (11) containing the copper and impurities in solution produced by the chemical reactions of the leaching stage (6).

Preferably the sulfuric acid concentration of the leaching solution (2) for the repulping (3), in order to get the first pulp (4) of molybdenite concentrate, it is found in the range of 0 to 20 g/l.

As an option, the clean concentrate (10) can be carried to the following stages, comprising:
carrying the clean molybdenite concentrate (10) to a washing stage (12), with washing water (13), to drag the mother liquor that is impregnated in the clean molybdenite concentrate (10);
carrying the washed clean molybdenite concentrate (14) to drying, packing and storage; or
carrying the washed wet or dry clean molybdenite concentrate (14) to roasting to obtain technical grade molybdenum trioxide.

Technical grade molybdenum trioxide is used in the manufacture of other molybdenum products, such as ferromolybdenum, or is used as a precursor for the manufacture of pure molybdates from molybdenum, such as ammonium dimolybdate (ADM), ammonium heptamolybdate (AHM) and other molybdates.

Eventually, the liquor (11) obtained from the solid/liquid separation stage (9) might contain molybdenum and rhenium in solution as a consequence of poor control of the process variables, such as pressure and temperature, in which case the liquor rich in copper and impurity (11) is carried to a solvent extraction stage to recover the molybdenum and rhenium. Copper is also recovered from the raffinate from this solvent extraction stage.

As an option, the liquor rich in copper and impurity (11) is treated in consecutive solvent extraction and electrodeposition or cementation stages for obtaining the copper.

Optionally the liquor rich in copper and impurity (11) is recirculated to the pressurized leaching stage (6).

The solid content in the pulp from 50 to 20% in weight (according to the liquid to solid ratio in the range of 1/1 to 4/1, volume/weight), reached in the repulping stage (3) promotes auto-thermal process, which condition can be achieved because of the exothermic nature of the chemical reactions that occur in the system.

The oxidizing atmosphere that is maintained in the leaching stage (6) is achieved due to the presence of an oxygen-bearing gas, as pure oxygen, air enriched with oxygen or air, with oxygen preferably being used.

During the leaching stage (6), the copper compounds and other elements from the $MoS_2$ concentrate are dissolved to produce the second pulp (7) that contains a mother liquor with copper and other impurities in solution (particularly the sulfuric acid generated in situ by the selective oxidation of the sulfur of the sulfides that said impurities formed in the dirty molybdenite concentrate) and a solid material (that contains the clean molybdenite concentrate) with a low content of copper and other impurities, whose concentrations are within the specifications of a commercial molybdenite concentrate.

The second pulp (7) that results from the leaching stage (6) has a pH between 0 and 2 and a potential for oxidation/reduction between 0.2 and 0.5 volts vs Ag/AgCl electrode.

The leaching process needs the continuous feed of the oxidizing gas (5) for the occurrence of the chemical reactions that allow to transform the copper sulfide compounds and other elements into soluble compounds. The chemical reactions of interest during the leaching stage, which are thermodynamically spontaneous within the indicated temperature range, are the following:

$$CuFeS_2 + H_2SO_4 + 5/4 O_2 + \tfrac{1}{2} H_2O = CuSO_4 + Fe(OH)_3 + 2S° \quad [1]$$

$$CuFeS_2 + 5/2 H_2O + 17/4 O_2 = CuSO_4 + 2H_2SO_4 + Fe(OH)_3 \quad [2]$$

$$CuS + H_2SO_4 + \tfrac{1}{2} O_2 = CuSO_4 + H_2O + S° \quad [3]$$

$$Cu_2S + 2H_2SO_4 + O_2 = 2CuSO_4 + 2H_2O + S° \quad [4]$$

In chemical reaction [1], the sulfur ($CuFeS_2$) is oxidized into elementary sulfur (S°). Chemical reaction [2] indicates that the sulfur ($CuFeS_2$) is oxidized into sulfate (in the form of copper sulfate and sulfuric acid), reaching its maximum state of oxidation with the consequent oxygen consumption. This latter aspect is important for the economy of the process.

The covellite (CuS) and chalcocite ($Cu_2S$), found, depending on their source, in variable quantities in the molybdenite concentrates, are oxidized according to chemical reactions [3] and [4].

The above reactions constitute a simplification of the oxidation complex process of the sulfides using pressurized oxygen. In particular, the formation of sulfuric acid in situ from elementary sulfur obtained in said reactions and gaseous oxygen is important, given the spontaneity of the next reaction to the process temperatures during the leaching stage (6) and the percentage of solids in the pulp that promote the formation in situ of sulfuric acid and its exothermic nature:

$$S° + 1.5O_2(g) + H_2O = H_2SO_4$$

Because of the high temperatures and pressures of the leaching stage (6), the use of a pressure reactor is required, particularly one that has been conditioned for such purpose, this may be one of the autoclave type that withstands high pressures, high temperatures and the acidity of the process. The basis for the operation of the autoclave(s) process of the invention may be in batch or continuous form. The autoclave itself can have different designs, such as horizontal or vertical, however in all these designs, the autoclave can have one or more paddles, with one or more compartments that are separated by baffles, with submerged gas injection or injection on top or both.

The residence time of the pulp inside the reactor must be sufficient for the correct development of the chemical reactions. Good leaching results are found to be obtained for residence times in the range from 15 to 240 minutes.

Regarding the solid/liquid separation stage (9), any separation process can be used to separate the clean molybdenite concentrate (10) from the liquor with the dissolved impurities (11). Commonly used techniques include: filtration, sedimentation, clarification, thickening, centrifugation, dewatering and decantation. The selection of the solid/liquid separation technique is not critical for the success of this invention.

The solid/liquid separation stage (9) is preferably carried out by filtration in a plate or diaphragm filter, with a washing liquid-solid ratio between 0.2 and 1.0 volume/weight.

In the washing stage (12) a washing water to solid product ratio in the range of 0.2 a 1.0 volume/weight is used.

EXAMPLES

Example N° 1: Oxidation Kinetics of Molybdenite Concentrates

In this example, the process of removing copper with respect to molybdenum from molybdenite concentrates is carried out with the following operating conditions: pulp temperature of 160° C., a partial pressure of $O_2$ of 80 psig (0.6 MPa), a ratio of liquid to solid of the first pulp of 2/1, volume/weight, and an initial acidity of 10 g/l de $H_2SO_4$.

Tables 1 and 2 show the chemical analysis and mineralogical composition of the six molybdenite concentrates from different sources that were tested.

TABLE 1

Chemical analysis of the concentrates (% in weight)

| Element | Concentrate | | | | | |
|---|---|---|---|---|---|---|
| % | N°1 | N°2 | N°3 | N°4 | N°5 | N°6 |
| Mo | 50.10 | 49.12 | 50.12 | 55.08 | 47.35 | 49.11 |
| Cu | 3.62 | 3.93 | 3.11 | 0.90 | 3.62 | 3.36 |

TABLE 2

Mineralogical composition mineral base (% in weight)

| Mineral | Concentrate | | | | | |
|---|---|---|---|---|---|---|
| | N°1 | N°2 | N°3 | N°4 | N°5 | N°6 |
| Chalcopyrite | 8.08 | 11.27 | 2.37 | 2.38 | 4.71 | 8.53 |
| Chalcocite | 0.08 | 0.23 | 0.05 | 0.06 | 0.85 | 0.01 |
| Covellite | 1.14 | 0.18 | 1.86 | 0.03 | 0.79 | 0.15 |
| Bornite | — | 0.05 | 0.05 | 0.02 | 0.40 | 0.41 |
| Enargite | — | — | 0.83 | — | 1.12 | — |
| Gray Copper | — | 0.13 | — | — | — | 0.07 |
| Pyrite | 0.18 | 0.82 | 2.35 | 1.80 | 6.35 | 2.37 |
| Molybdenite | 85.96 | 82.17 | 84.09 | 91.19 | 78.64 | 83.65 |
| Gangue | 4.54 | 5.14 | 8.40 | 4.53 | 7.15 | 4.81 |
| TOTAL, % | 100 | 100 | 100 | 100 | 100 | 100 |

Table 3 shows the results obtained for the residence time of the pulp inside the reactor, using the six $MoS_2$ concentrates.

TABLE 3

Leaching kinetics with pressurized oxygen. The residual copper is shown in the concentrate (% in weight) the dissolved molybdenum with respect to the initial amount in the concentrate (% in weight).

| Concentrate | N°1 | | N°2 | | N°3 | | N°4 | | N°5 | | N°6 | |
|---|---|---|---|---|---|---|---|---|---|---|---|---|
| Elements | Cu | Mo | Cu | Mo | Cu | Mo | Cu | Mo | Cu | Mo | Cu | Mo |
| Time, min | | | | | | | | | | | | |
| 0 | 3.75 | 0.00 | 3.93 | 0.00 | 3.11 | 0.00 | 0.90 | 0.00 | 3.62 | 0.00 | 3.36 | 0.00 |
| 15 | 0.34 | 0.00 | 2.21 | 0.00 | 0.36 | 0.80 | 0.38 | 0.02 | 0.94 | 0.02 | 2.72 | 0.00 |
| 30 | 0.13 | 0.60 | 1.64 | 0.00 | 0.12 | 3.53 | 0.27 | 0.03 | 0.67 | 0.14 | 2.40 | 0.00 |
| 45 | 0.11 | 1.90 | 1.45 | 0.00 | 0.16 | 4.84 | 0.16 | 0.27 | 0.38 | 1.30 | 2.13 | 0.00 |
| 60 | 0.09 | 2.60 | 1.07 | 0.00 | 0.07 | 10.54 | 0.06 | 1.16 | 0.31 | 1.86 | 1.84 | <0.01 |

This example leads to the conclusion that good results are obtained for the extraction of copper with a leaching time between 15 and 60 minutes, except for concentrates N° 2 and N° 6. With these last two concentrates, good leaching results were only obtained (a result for Cu of less than 0.5% in weight) either by re-milling or mixing with molybdenite concentrates containing chalcocite and/or covellite in its mineralogy.

Example N° 2: Tests with Concentrate that Only Contains Chalcopyrite (Concentrate N° 6)

In this example, two tests were performed with concentrate N° 6, varying the granulometry of the sample (results given in table 4), varying the temperature (results given in table 5) and varying the oxygen pressure (results given in table 6).

These tests were performed considering, if said variables are not part of the test, an initial acidity of 10 g/l, a pulp temperature of 175° C., an oxygen overpressure of 80 psig (0.6 MPa) and a liquid to solid ratio equal to 2/1, volume/weight.

TABLE 4

Influence of the decreased particle size on the copper leaching. The residual copper in the concentrate (% in weight) and the dissolved molybdenum are shown with respect to the initial amount in the concentrate (% in weight).

| | Variable | | | |
|---|---|---|---|---|
| | Not Milled | | Milled | |
| | Elements | | | |
| Time, min | Cu | Mo | Cu | Mo |
| 0 | 3.36 | 0.00 | 3.36 | 0.00 |
| 30 | 1.69 | 0.05 | 0.15 | 19.8 |

The results in table 4 lead to the conclusion that the increased reaction area obtained by remilling the concentrate allows to achieve the objective of obtaining less than 0.5% in weight of copper in the clean concentrate through the increase of reaction kinetics.

TABLE 5

Influence of the temperature on the copper leaching. The residual copper in the concentrate (% in weight) and the dissolved molybdenum are shown with respect to the initial amount in the concentrate (% in weight).

| | Variable | | | |
|---|---|---|---|---|
| | 160 ° C. | | 175 ° C. | |
| | Elements | | | |
| Time, min | Cu | Mo | Cu | Mo |
| 0 | 3.36 | 0.00 | 3.36 | 0.00 |
| 30 | 2.40 | 0.00 | 1.69 | 0.05 |

The results show a significant increase in reaction kinetics as the process temperature rises, indicating a possible chemical or electrochemical control of the overall reaction.

TABLE 6

Influence of the oxygen overpressure on the copper leaching. The residual copper in the concentrate (% in weight) and the dissolved copper are shown with respect to the initial amount in the concentrate (%).

| | Variable | | | |
|---|---|---|---|---|
| | 80 psig (0.6 MPa) | | 150 psig (1.0 MPa) | |
| | Elements | | | |
| Time, min | Residual Cu | Dissolved Cu | Residual Cu | Dissolved Cu |
| 0 | 3.36 | 0.00 | 3.36 | 0.00 |
| 30 | 1.69 | 50.7 | 1.27 | 66.1 |

The results show an increase in the reaction kinetics increasing the oxygen overpressure.

These examples lead to the conclusion that the decreased of the granulometry and the rise of the pressure and temperature in the system have favorable effects on the reaction rate of the copper leaching.

The process of this invention can be efficiently controlled in an industrial plant through the control of the following variables: temperature of the pulp in the autoclave and oxygen overpressure, basically.

The reaction kinetic of the process that is the subject matter of this invention is fast thus enabling the achievement, in industrial practices, of very high cleaning capacities for the molybdenite concentrate in relation to the useful volume of the autoclave.

The oxidation reactions of sulfides permit the efficient use of the heat from the reaction (exothermic process) to set the process temperature and obtain an auto-thermal operation, on condition that the liquid/solid ratio is set as indicated in the present invention, This is a huge advantage with respect to the cleaning processes for molybdenite concentrates that are known at the present time (for example, leaching with chlorides).

The invention claimed is:

1. An industrially scalable process for the selective removal of copper compounds and other impurities with respect to molybdenum and rhenium from a molybdenite ($MoS_2$) concentrate with a copper content of more than 0.5% by dry weight, comprising the following steps:
   (a) mixing a concentrate of impure $MoS_2$ (1) with process water and/or a leaching solution of dilute sulfuric acid in water (2), in which the concentration of sulfuric acid is up to 20 g/l, in a repulping stage (3), to obtain a first pulp (4) with a solid content in the pulp of 50% to 20% by weight, maintaining a ratio of liquid to solid in the range of 1/1 to 4/1, volume/weight;
   (b) leaching the first pulp (4) inside a pressure reactor, in a pressurized leaching stage (6) under an oxidizing atmosphere, with an oxygen-bearing gas (5), at a leaching temperature between 110° C.-180° C. with a partial pressure for the oxidizing gas inside the reactor between 20-150 psig (0.1-1.0 MPa) to obtain a second pulp (7) containing a cleaned molybdenite concentrate and a mother liquor containing dissolved impurities, including sulfuric acid that was generated in situ by the selective oxidation of sulfur contained in the sulfides that initially comprised the impurities in the molybdenite concentrate;
   (c) carrying the second pulp (7) to a cooling tank (8), to obtain a third pulp (7a) with a temperature of at most 60° C.; and (d) carrying the third pulp (7a) to a solid/liquid separation stage (9) to obtain a clean molybdenite concentrate (10) with a percentage of copper of less than 0.5% by weight and a liquor (11) containing the copper and impurities in solution produced by chemical reactions in the pressurized leaching stage (6).

2. The process according to claim 1, wherein the clean molybdenite concentrate (10) is carried to the following steps, comprising:

(e) carrying the clean molybdenite concentrate (10) to a washing stage (12) with washing water (13), to extract the mother liquor that is impregnated in the clean molybdenite concentrate (10), to obtain a washed clean molybdenite concentrate (14); and (f) carrying the washed clean molybdenite concentrate (14) to drying, packing and storage;

or (g) carrying the washed wet or dry clean molybdenite concentrate (14) to roasting to obtain technical grade molybdenum trioxide.

3. The process according to claim 2, wherein the technical grade molybdenum trioxide obtained in stage (g) is used in the manufacture of other molybdenum products, or is used as a precursor for the manufacture of pure molybdates from molybdenum.

4. The process according to claim 1, wherein the liquor (11), rich in copper and impurities obtained in step (d) of the solid/liquid separation (9), contains molybdenum and rhenium in solution, the liquor (11) is carried to a solvent extraction stage for separating the molybdenum and the rhenium.

5. The process according to claim 1, wherein the liquor (11) rich in copper and impurities is treated by consecutive stages of solvent extraction and electrodeposition, or cementation, to obtain the copper.

6. The process according to claim 1, wherein the liquor (11) rich in copper and impurities is recirculated to the pressurized leaching stage (6).

7. The process according to claim 1, wherein the copper compounds present in the solid material (1) to be removed correspond to primary sulfides and secondary sulfides.

8. The process according to claim 7, wherein the primary sulfides correspond to chalcopyrite ($CuFeS_2$) and the secondary sulfides correspond to chalcocite ($Cu_2S$) and covellite (CuS).

9. The process according to claim 1, wherein the oxygen-bearing gas (5) is selected from pure oxygen, oxygen-enriched air, or air.

10. The process according to claim 1, wherein the pressure reactor is a horizontal or vertical autoclave, with one or more paddles, and having one or more compartments separated by baffles, with submerged gas injection, or injection on top, or both.

11. The process according to claim 1, wherein the residence time of the pulp inside the pressure reactor is between 15 and 240 minutes.

12. The process according to claim 1, wherein the second pulp (7) resulting from the leaching stage (6) has a pH between 0 and 2 and a potential for oxidation/reduction between 0.2 and 0.5 volts vs Ag/AgCl.

13. The process according to claim 1, wherein in step (d), the solid/liquid separation stage (9) is carried out by filtration, sedimentation, clarification, thickening, centrifugation, dewatering, or decantation.

14. The process according to claim 13, wherein the solid/liquid separation stage (9) is carried out by filtration in a plate or diaphragm filter, with a washing liquid-solid ratio between 0.2 and 1.0 volume/weight.

15. The process according to claim 3, wherein said other molybdenum products comprise ferromolybdenum.

16. The process according to claim 3, wherein said precursor for the manufacture of pure molybdates from molybdenum comprises ammonium dimolybdate (ADM), ammonium heptamolybdate (AHM), or other molybdates.

* * * * *